United States Patent [19]

Shimizu

[11] Patent Number: 5,360,291
[45] Date of Patent: Nov. 1, 1994

[54] METHOD FOR LAYING CABLE OR HOSE IN CHANNEL AND CHANNEL THEREFOR

[75] Inventor: Shohachi Shimizu, Ogaki, Japan

[73] Assignee: Miral Industries Co., Ltd., Anpachi, Japan

[21] Appl. No.: 862,317

[22] Filed: Apr. 2, 1992

[30] Foreign Application Priority Data

Jun. 27, 1991 [JP] Japan .................. 3-156368
Jul. 12, 1991 [JP] Japan .................. 3-172682

[51] Int. Cl.⁵ .................................. F16L 1/00
[52] U.S. Cl. ................. 405/154; 254/134.3 R; 405/184
[58] Field of Search ............ 405/177, 184, 154; 138/108, 115, 117, 172, DIG. 11; 254/134.3 FT, 134.3 R

[56] References Cited

U.S. PATENT DOCUMENTS

| | | | |
|---|---|---|---|
| 356,152 | 1/1887 | Munsie | 254/134.3 R |
| 426,196 | 4/1890 | Munsie | 254/134.3 R |
| 447,350 | 3/1891 | Reilly | 254/134.3 R |
| 458,778 | 9/1891 | Reilly | 254/134.3 R |
| 524,789 | 8/1894 | Reilly | 254/134.3 R |
| 825,070 | 7/1906 | Peirce | 254/134.3 R |
| 3,720,235 | 3/1973 | Schrock | 138/108 X |
| 4,064,355 | 12/1977 | Neroni et al. | 138/115 X |
| 4,389,138 | 6/1983 | Söderström | 138/115 X |
| 4,410,013 | 10/1983 | Sasaki et al. | 138/115 X |
| 4,465,261 | 8/1984 | Giroux | 254/134.3 FT X |
| 4,595,317 | 6/1986 | Möller et al. | 138/115 X |
| 4,609,154 | 9/1986 | Rinkewich | 138/115 X |
| 4,688,890 | 8/1987 | DeMed et al. | 138/108 X |
| 4,778,977 | 10/1988 | Bleckman | 138/115 X |
| 4,824,288 | 4/1989 | Naito | 138/115 X |
| 4,865,294 | 9/1989 | Kaczynski | 254/134.3 R |
| 4,930,544 | 6/1990 | Ziu | 138/115 X |
| 5,029,815 | 7/1991 | Kumpf | 254/134.3 FT |
| 5,096,000 | 3/1992 | Hesse | 405/184 X |

Primary Examiner—David H. Corbin
Attorney, Agent, or Firm—Lackenbach Siegel Marzullo Aronson & Greenspan

[57] ABSTRACT

A method for laying a cable and/or a hose or a plurality thereof into a channel buried in a wall or the ground or laid outdoors, said channel comprising a chute with a slit provided longitudinally therethrough which is to receive a pilot line device to be used to lay a cable or a hose through the channel route of the channel. And a channel to be utilized by said method.

2 Claims, 6 Drawing Sheets

METHOD FOR LAYING CABLE OR HOSE IN CHANNEL AND CHANNEL THEREFOR

BACKGROUND OF THE INVENTION

1. Field of the Invention

This invention relates to a method for laying a cable such as an electric wire or a signal wire and/or a flexible hose for fluid such as hot water or a gas in a channel buried in wall or the ground and this invention also relates to a channel used therefor.

2. Description of the Prior Art

In the conventional cable laying art regarding, for example, a channel buried in a wall, the channel is generally made of a synthetic resin with its outer surface made smooth for easy laying or wavy for easy bending.

Recently a protective channel for laying therein a flexible hose or hoses for a liquid such as hot water or a gas has also been increasingly in use for the purpose of facilitating their easy replacement as well as protecting the hose or hoses therein.

In order to lay an electric cable in a channel according to the prior art, generally a pilot line is first introduced into the channel from the first opening of said channel and said pilot line is dragged out of the second opening of the channel, and then an electric cable is connected to the pilot line at said second opening of the channel, which is then dragged by means of said pilot line through said channel to said first opening so as to be laid in the channel. Said pilot line is then removed from said electric cable.

In order to lay a flexible hose into a protective channel according to the prior art such as the Japanese utility model publication No. 61-32880/86 (Sekisui Kagaku Kogyo Co., Ltd.) and Japanese patent publication No. 63-62990/88 (Sumisho Hitetsu Hanbai Co., Ltd and Mirai Kogyo Co., Ltd.), generally a hose is introduced from the first opening of the protective channel and is driven forward in the channel little by little by hand, which is made possible as the hose is made flexible but rigid enough for the operation.

However, there exists a problem in the aforementioned cable and hose laying works according to the prior art. That is, the cable(s) and/or the hose(s) previously laid and existing in a protective channel will hinder a later cable or hose, occasionally making such a subsequent hose laying work next to impossible or extremely difficult.

SUMMARY OF THE INVENTION

It is, therefore, an object of the present invention to provide a method to facilitate a cable or a hose laying work without such a hindrance as mentioned above.

A further object of the present invention is to provide a channel to be used in a cable or a hose laying method of the present invention.

With the above and other objects in mind a novel feature of the present invention is the provision of a method for laying a cable or a hose utilizing a channel comprising a tube with a chute with a longitudinally provided slit therethrough. The channel route of said tube receives a cable or a hose or a plurality of cable/-hoses, the chute receives a pilot line device comprising a shuttle member, a line member connected to said shuttle member, a tongue member also connected to said shuttle member and a connection hole in the tongue member. The slit receives said tongue member, and said line member being made flexible but rigid or stiff enough to be driven forward through said chute by hand. After it is conducted through said chute, the pilot line device is used to drag through the channel route of said tube a cable or a hose connected thereto by means of said connection hole in said tongue member and a rope is used to lay through the channel route a dragging line to drag through the channel route a cable or a hose connected thereto after it is driven through said channel route by means of said pilot line device.

According to the present invention, cable or hose laying work can be performed without the hindrance which has often been the case in the prior art particularly where cables or hoses have been previously laid and exist already in a channel.

DESCRIPTION OF THE PREFERRED EMBODIMENT

Figure 1:
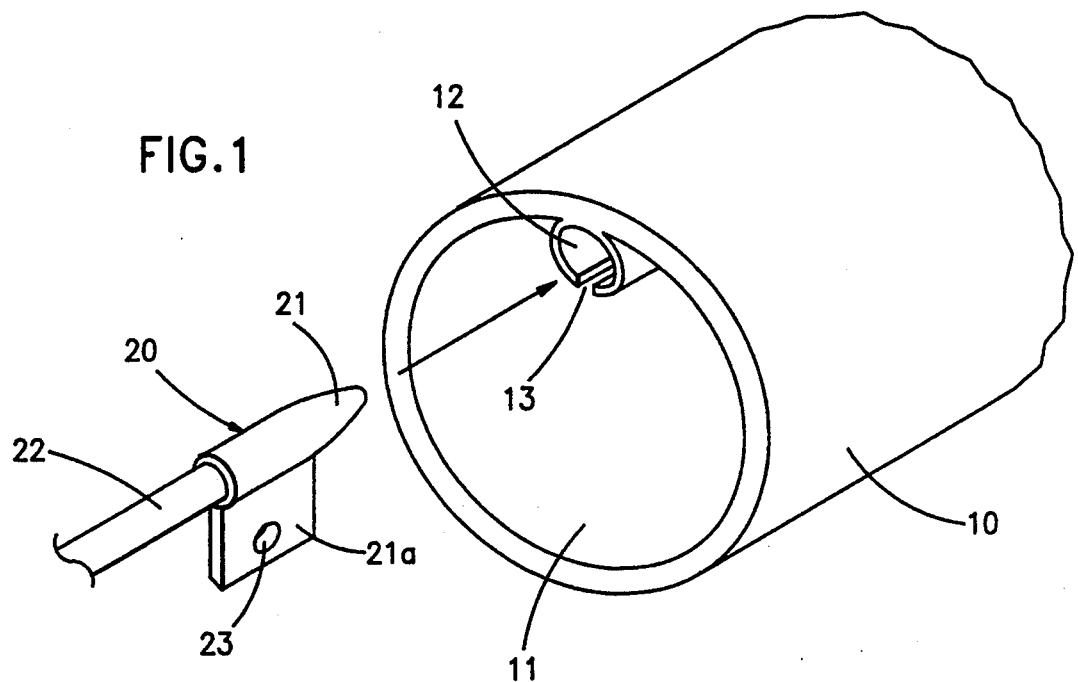
FIG. 1 is a partial perspective view of a channel and a pilot line device, showing an embodiment of the present invention.
Figure 2:
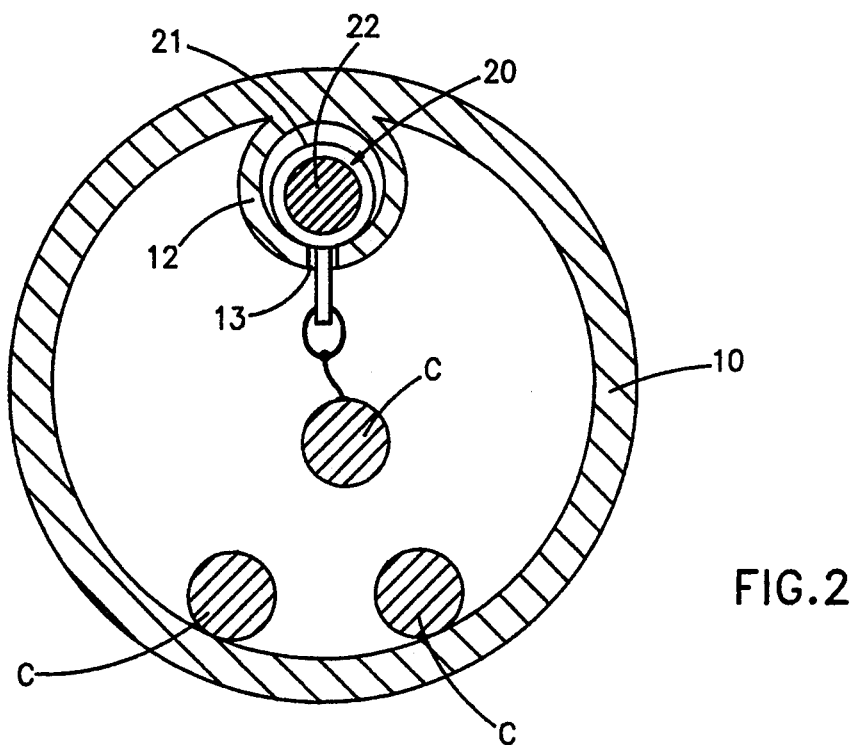
FIG. 2 is a cross-sectional view of the channel as shown in FIG. 1 with the pilot line device in the chute, a cable connected thereto by means of the connection hole in the tongue member and a rope and two existing cables lying in the channel route, showing an embodiment of the present invention.

As is shown in FIG. 1, a channel system of the present invention comprises a channel comprising a tube 10 with a chute 12 inwardly provided thereon having a slit 13 longitudinally disposed therethrough and, a pilot line device 20 comprising a shuttle member 21, a line member 22 connected to the shuttle member 21 and a tongue member 21a also connected to the shuttle member 21. The tube 10 is provided with a channel route 11, said shuttle member 21 is shaped like a bullet head and said tongue member 21a is provide with a connection hole 23. The channel route 11 receiving a cable or a hose or a plurality thereof, said chute 12 receiving said pilot line device 20, said slit 13 receiving said tongue member 23, and said connection hole receiving a rope to be connected with a cable or a hose. The line member 22 of said pilot line member 20 being flexible but rigid or stiff enough to be driven forward through said chute 12 by hand without collapse of same.

Figure 5:
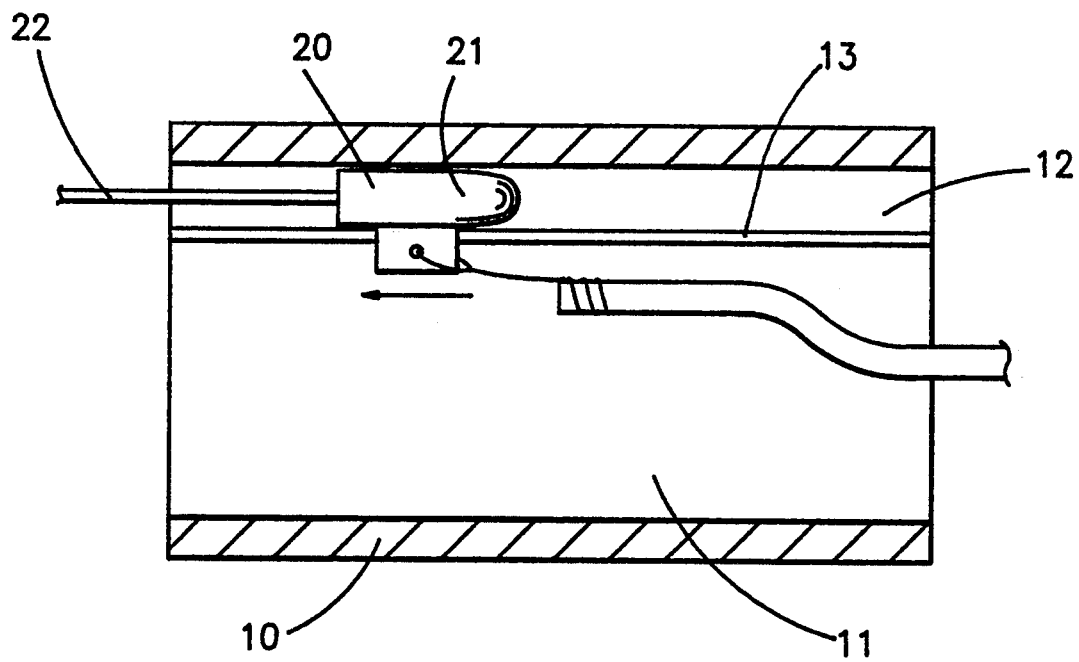
FIG. 5 is a partial longitudinal cross-sectional view of the channel as shown in FIG. 1 and an illustration of a cable connected to a pilot line device in the chute, showing a process of the present invention.

As is shown in FIG. 5, the pilot line device 20 is driven through the chute 12 by hand and the tongue member 21a moves through the slit 13 in the chute 12. The shuttle member 21 of the pilot line device 20 is used to drag a cable (C) or a hose and is shaped like a bullet head so that it may smoothly move through said chute 12 together with said line member 22. The connection hole 23 in said tongue member 21a is used to connect a cable (C) or a hose thereto by means of a rope.

Figure 3:
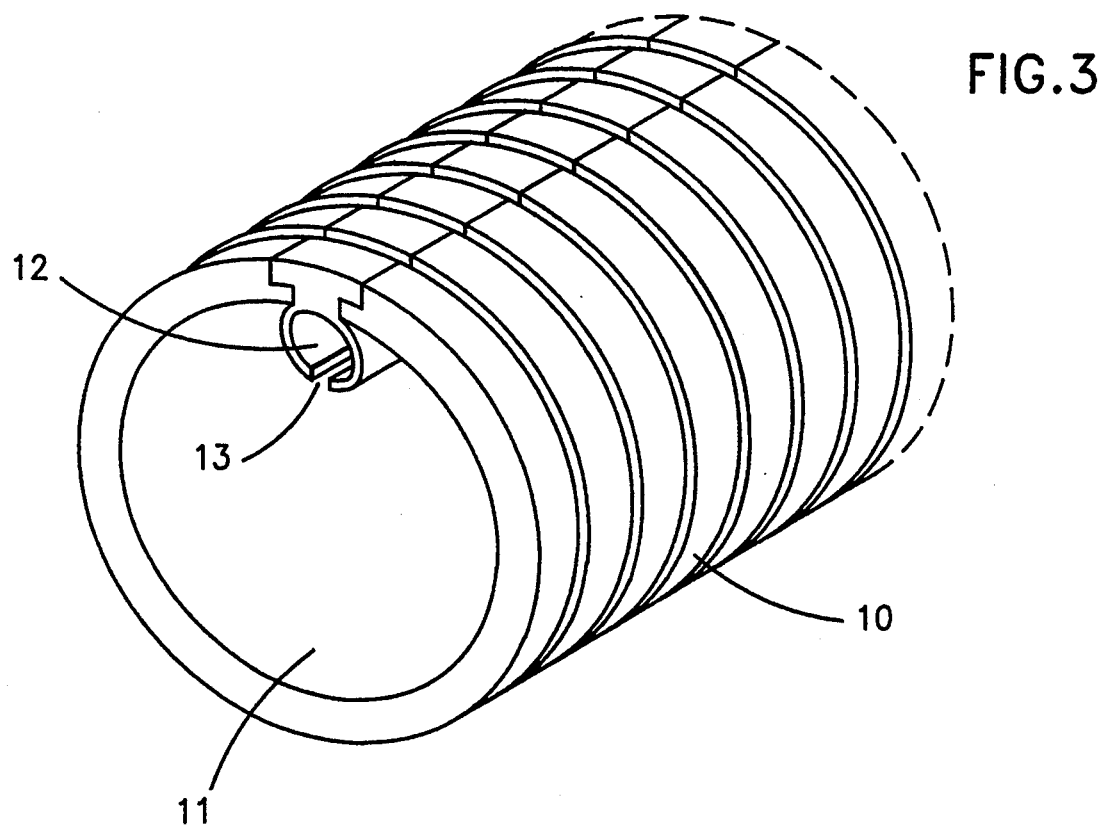
FIG. 3 is a partial perspective view of a channel having a wavy outside surface and an inlaying type of chute, showing another embodiment of the present invention.

A channel of the present invention comprising a tube 10 and a chute 12 with a slit 13 provided longitudinally therethrough can be prepared in a single manufacturing process, or the tube 10 and the chute 12 with the slit 13 can be prepared separately and put together later such as shown in FIG. 3. A channel of the present invention preferably made of synthetic resin, however, it can also be made of another materials such as metal.

Figure 11:
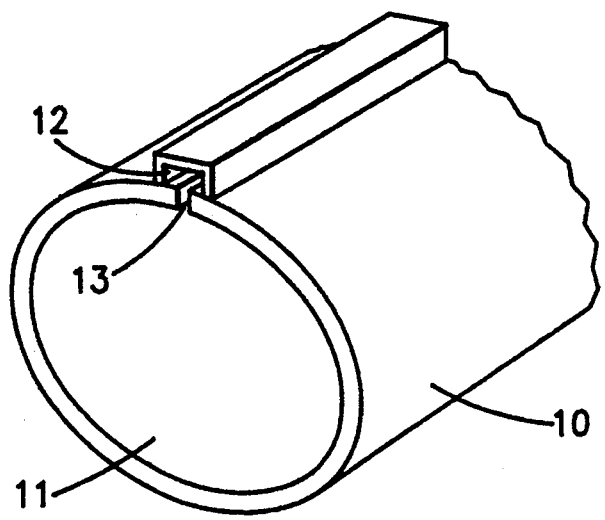
FIG. 11 is a partial perspective view of a channel having a chute on the outer surface of the channel tube and with the slit in the tube, showing another embodiment of the present invention.

The chute 12 of the present invention can take another shape in cross-section other than round, such as oval, triangular or rectangular as shown in FIG. 11.

The pilot line device 20 comprises a shuttle member 21 with a tongue member 21a connected to said shuttle member 21 having a connection hole 23 therein, and a line member 22 connected to said shuttle member 21 is flexible but rigid or stiff enough to be driven forward through the chute 12 by hand without collapse thereof. Said tongue member 21a travels through said slit 13.

A line member 22 of the present invention can advantageously be a steel wire, a twisted fine steel wire, an extrusion-formed synthetic resin rope, a hard-twist synthetic resin fibre rope or a fibre-reinforced plastic rope.

Instead of providing the tongue member 21a, the shuttle member 21 can have a hole or a hook (not shown), for instance, in the head or top part thereof for connection to a cable (C) or a hose or a dragging line 30 in lieu of the connection hole 23 in the tongue member 21a.

The shuttle 21 need not be bullet head-shaped. It can be round column-shaped or ball-shaped or any shape that can go through the chute 12, although bullet head-shaped shuttle is preferred because such a shuttle 21 can generally travel more smoothly through the chute 12. The length of said shuttle member 21 should not be so long as to be a hindrance to the passage through said chute 12.

The shuttle member 21 may be provided if desired with rolling means such as a caster roller or rollers (not shown) so as to further facilitate the smooth movement of the pilot line device 20 through the chute 12.

The tube 10 of the present invention may take another shape in cross-section other than round as shown throughout the drawings, such as oval, triangular or rectangular as well. The outer surface of a tube 10 may be shaped wavy such as shown in FIG. 3 in order to give both flexibility and strength to the channel since a channel is occasionally used in a bent or curved manner.

The wavy or corrugated-like tube 10 shown in FIG. 3 has a separately prepared chute 12 which is provided in the longitudinal opening prepared in the tube 10. A channel with a wavy tube 10 and a chute 12 having a slit 13 can also be prepared together in a single manufacturing process by means of an extrusion formed of synthetic resin.

A chute 12 may be provided on the outer surface of the tube 10 instead of the inner surface, as shown in FIG. 11. Further, a plurality of chutes 12 may be provided in a channel of the present invention (not shown) instead of just one to provide for the laying of a plurality of cables or hoses at a time.

Figure 12:
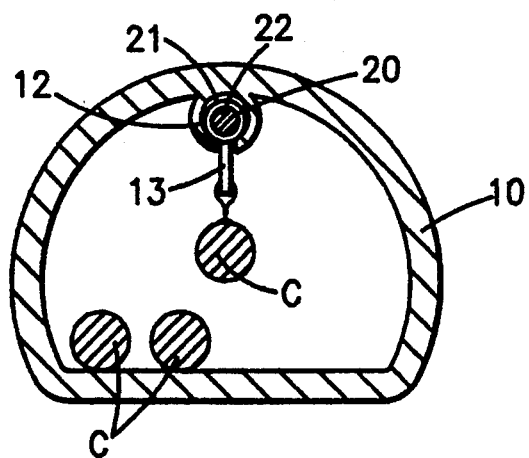
FIG. 12 is a cross-sectional view of a channel having the bottom part of the channel tube substantially flat, and showing same together with a pilot line device in the chute, a cable connected to the tongue member of the pilot line device and two cables lying on the bottom of the channel route, showing still another embodiment of the present invention.

A channel of the present invention is buried in a wall or the ground or laid outdoors. In case a channel of the present invention is used in the ground, a part of the outer surface of the tube 10 which is opposite the chute may be shaped substantially flat as shown in FIG. 12 so that said outer surface may easily and stably be set in the ground with the flat part facing downward and the chute 12 above the flat part of the channel route 11.

Cable laying processes according to the present invention are described in detail as follows.

Figure 4:
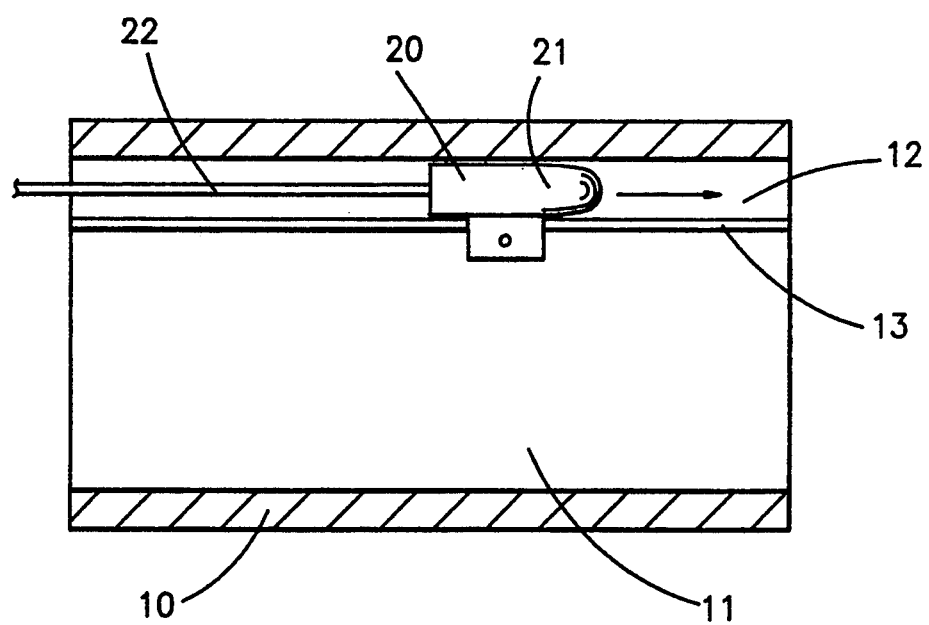
FIG. 4 is a partial longitudinal cross-sectional view of the channel as shown in FIG. 1 and an illustration of a pilot line device in the chute, showing a process of the present invention.

FIGS. 4 and 5 show a case where a cable (C) is to be laid in a channel by means of a pilot line device 20. The shuttle member 21 of the pilot line device 20 is inserted in the chute 12 at a first opening of the chute 12 with the tongue member 21a fitting into the slit 13. The pilot line device 20 is sent forward by means of driving the line member 22 connected to the shuttle 21 forward by hand in the chute 12 until the shuttle member 21 comes out of a second opening of the chute 12 and the line member 22 is completely conducted over the chute 12.

A cable (C) is then connected at said second opening of the chute 12 to the connection hole 23 of the tongue member 21a by means of a rope or the like. The line member 22 is then pulled back from said first opening of the chute 12 and the cable (C) connected to the connection hole 23 of the tongue member 21a is together dragged into the channel route 11 of the tube 10 to be laid therethrough. When the cable (C) comes out of the channel route 11 at the side of the first opening of the chute 12, the cable (C) is removed from the connection hole 23 of the tongue member 21a.

Figure 6:
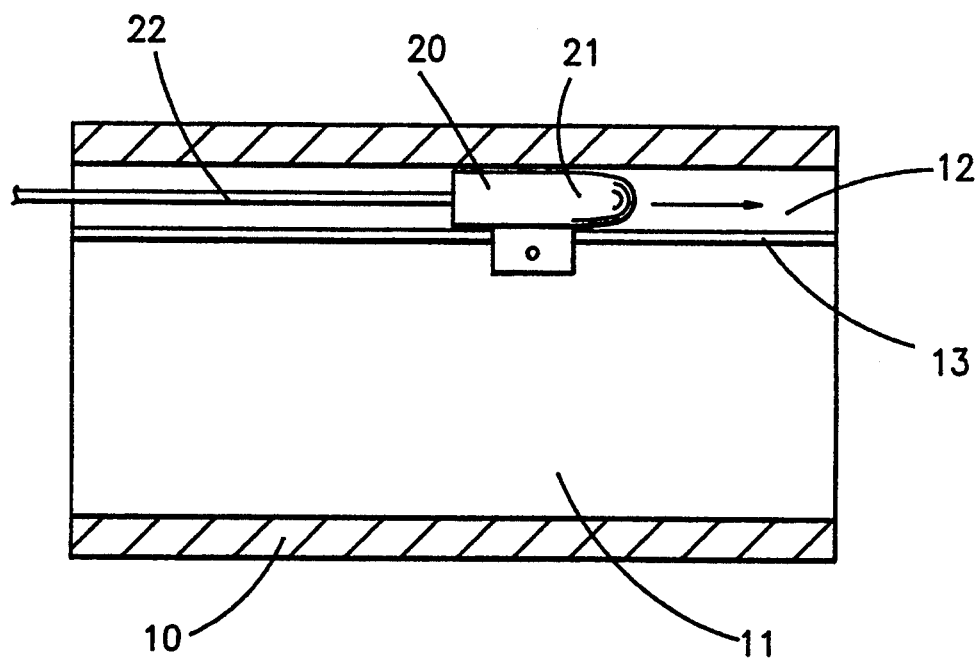
FIG. 6 is a partial longitudinal cross-sectional view of the channel as shown in FIG. 1 and an illustration of a pilot line device in the chute, showing a process of the present invention.
Figure 7:
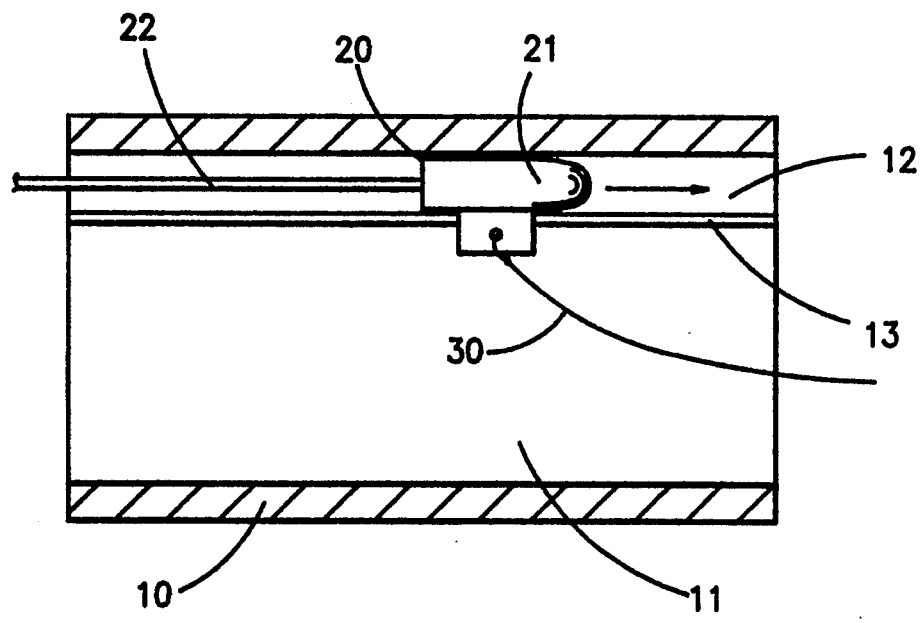
FIG. 7 is a partial longitudinal cross-sectional view of the channel as shown in FIG. 1 and an illustration of a dragging line connected to a pilot line device in the chute, showing a process of the present invention.
Figure 8:
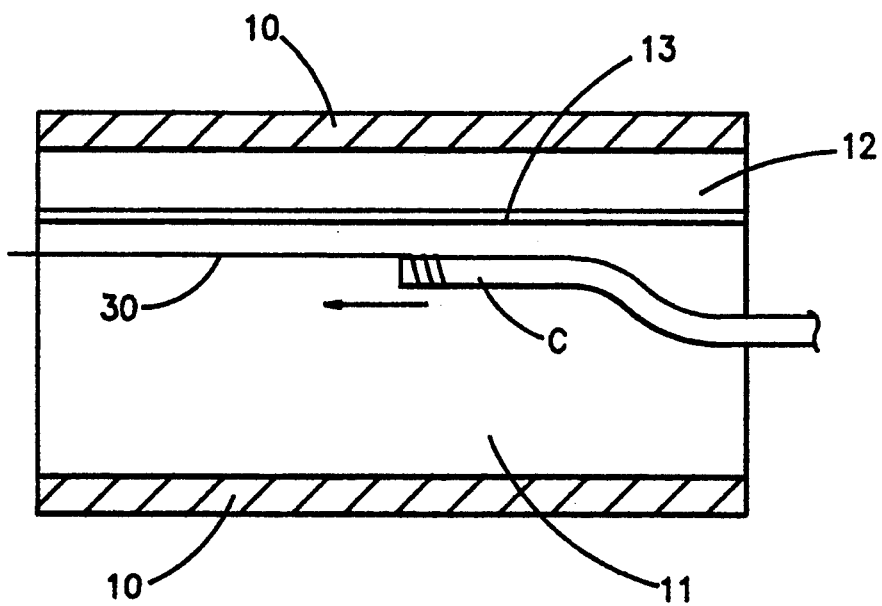
FIG. 8 is a partial longitudinal cross-sectional view of the channel as shown in FIG. 1 and an illustration of a cable connected to a dragging line in the channel route, showing a process of the present invention.

FIGS. 6 to 8 show another cable laying method by means of a dragging line 30. First, as is shown in FIG. 6, the pilot line device 20 is inserted into a first opening of the chute 12 and the tongue member 21a is placed in the slit 13. The line member 22 is driven forward by hand through the chute 12 in the same manner described above. Next, at a second opening of the chute 12 a dragging line 30 is connected to the connection hole of the tongue member 21a of the shuttle member 21 by means of a rope. The rope may be anything that can connect a cable or a hose to the connection hole 23. Then the pilot line device 20 is pulled back through the chute 12 so that the dragging line 30 is conducted throughout the channel route 11, as shown in FIG. 7. The dragging line 30 is then connected to a cable (C) at either opening of the channel route 11. Then the dragging line 30 is pulled again at the side not used for connecting the cable (C) through the channel route 11 of the tube 10 until the cable (C) is completely conducted through the channel route 11, as shown in FIG. 8. When the cable (C) is laid through the channel route 11, the dragging line 30 is disconnected from the cable (C). This method is advantageous when a heavier cable is to be laid in a tube 10.

Figure 9:
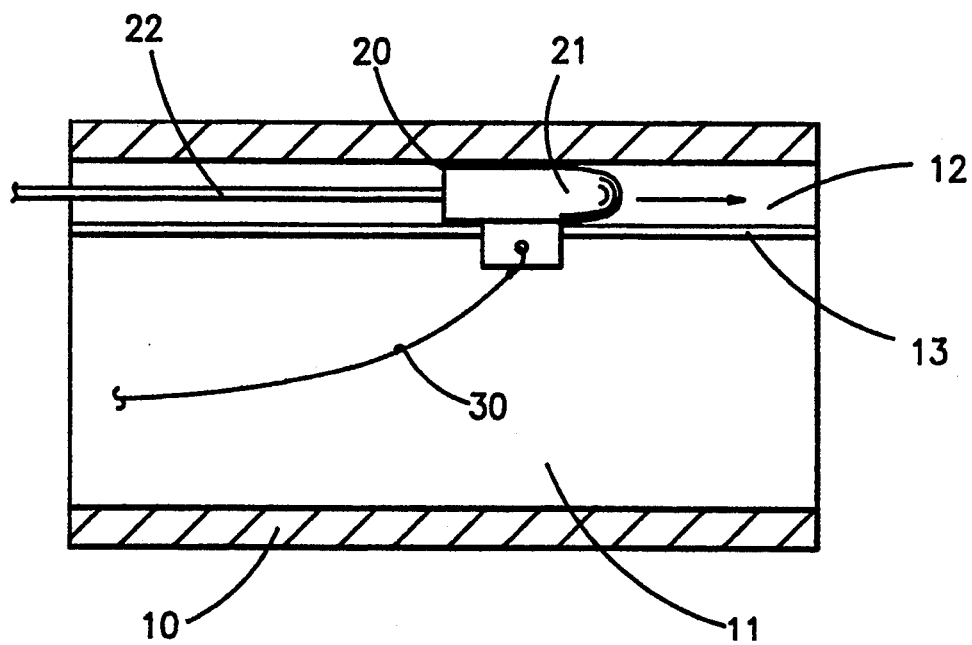
FIG. 9 is a partial longitudinal cross-sectional view of the channel as shown in FIG. 1 and an illustration of a dragging line connected to a pilot line device in the chute, showing process of the present invention.
Figure 10:
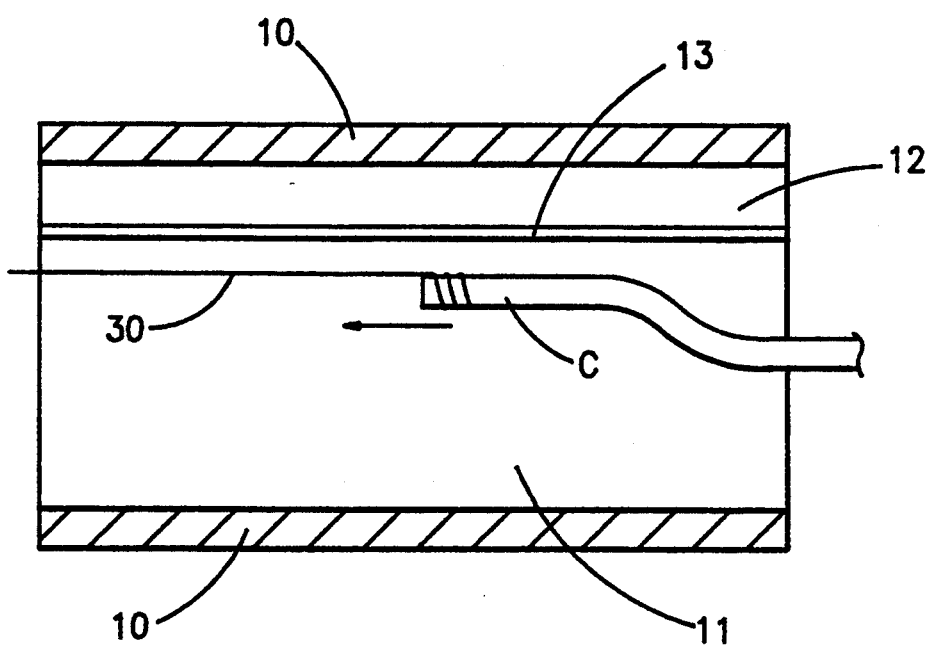
FIG. 10 is a partial longitudinal cross-sectional view of the channel as shown in FIG. 1 and an illustration of a cable connected to a dragging line in the channel route, showing a process of the present invention.

FIGS. 9 and 10 show another cable laying method by means of a dragging line 30. A dragging line 30 is connected to the connection hole 23 at a first opening of the chute 12 and laid through the channel route 11 in the manner shown in FIG. 9. The dragging line 30 is removed from the connection hole 23 at a second opening of the chute 12 and connected to a cable (C) there. The dragging line 30 and the cable (C) are dragged through the channel route 11 in the manner shown in FIG. 10. The dragging line 30 is removed from the cable (C) at the first opening of the chute 12 and the cable (C) can then be laid through the channel route 11.

The dragging line 30 to be used in the present invention can be anything which is pliable and strong enough for dragging a cable (C) or a hose in a channel system having a tube for laying cable in accordance with the present invention.

The dragging line 30 is advantageously utilized when a cable (C) or a hose is large in diameter. Or it is advantageously utilized when a cable (C) or a hose is heavy. It is also advantageously utilized in laying a cable (C) or a hose in a channel buried in the ground or in case a channel is bent at several places.

According to the methods for laying a cable and/or a hose of the present invention described so far using FIG. 4 through FIG. 10, a cable or a hose can easily be laid in a channel in addition to other cables or hoses already laid and existing in the channel, since such existing cables or hoses lie on the bottom of the channel route, which provides room above the cables or hoses for another cable or hose for a gas or water pipe or a plurality of pipes thereof. As a result, both a cable laying work and a hose laying work, which are usually both troublesome and time-consuming in the prior art, can be much less strenuous and more efficient.

What is claimed is:

1. A method for laying a cable in a surface through a channel having a channel route comprising a tube and a chute with a slit longitudinally therethrough, comprising the steps of:
   a) introducing a pilot line shuttle device having a head for smooth guidance through said chute, and comprising a line member which is flexible but rigid and stiff enough to be driven forward into and through said chute by hand without collapse thereof at a first opening of the chute, and driving the pilot line shuttle device forward through the chute without pulling until an end of the pilot line shuttle device reaches a second opening of the chute;
   b) connecting a dragging line to said pilot line shuttle device at the second opening of said chute;
   c) pulling back said pilot line shuttle device to which the dragging line is connected through said chute to drag and lay said dragging line through the channel route of the channel;
   d) connecting a cable to said dragging line at either opening of said channel route of the channel; and
   e) pulling said dragging line from the other opening of the channel route to drag and lay the cable through the channel route; whereby the laying of said cable is less strenuous and more efficient.

2. A method for laying a cable in a surface through a channel having a channel route comprising a tube and a chute with a slit longitudinally therethrough, comprising the steps of:
   a) connecting a dragging line to a pilot line shuttle device having a head for guidance through said chute, and comprising a line member which is flexible but rigid and still enough to be driven forward through said chute by hand;
   b) introducing said pilot line shuttle device into said chute at a first opening of the chute and driving said pilot line shuttle device forward through said chute without pulling until an end of the pilot line shuttle device reaches a second opening of the chute and said dragging line is laid through the channel route of said channel;
   c) removing said dragging line from said pilot line shuttle device at a second opening of the chute;
   d) connecting a cable to said dragging line at either opening of the channel route of the channel; and
   e) pulling said dragging line from the other opening of the channel route to drag and lay the cable through the channel route; whereby the laying of said cable is less strenuous and more efficient.

* * * * *